United States Patent
Mileva et al.

(10) Patent No.: US 12,252,605 B2
(45) Date of Patent: Mar. 18, 2025

(54) COMPOSITIONS DERIVED FROM POST-CONSUMER RECYCLATES BASED MATERIALS WITH LOW CRYSTALLIZATION TEMPERATURE

(71) Applicant: BOREALIS AG, Vienna (AT)

(72) Inventors: Daniela Mileva, Linz (AT); Hermann Braun, Linz (AT); Susanne Margarete Kahlen, Linz (AT); Gennaro Signorelli, Linz (AT); Gisela Lehner, Linz (AT); Lionel Delaviere, Courbevoie (FR)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 18/567,638

(22) PCT Filed: Jun. 9, 2022

(86) PCT No.: PCT/EP2022/065622
§ 371 (c)(1),
(2) Date: Dec. 6, 2023

(87) PCT Pub. No.: WO2022/258728
PCT Pub. Date: Dec. 15, 2022

(65) Prior Publication Data
US 2024/0262998 A1 Aug. 8, 2024

(30) Foreign Application Priority Data

Jun. 11, 2021 (EP) .................................... 21179097

(51) Int. Cl.
*C08L 23/12* (2006.01)
(52) U.S. Cl.
CPC ............ *C08L 23/12* (2013.01); *C08L 2203/18* (2013.01); *C08L 2205/02* (2013.01); *C08L 2207/20* (2013.01)
(58) Field of Classification Search
CPC ....................................................... C08L 23/12
USPC ......................................................... 524/427
See application file for complete search history.

(56) References Cited

U.S. PATENT DOCUMENTS

2011/0105667 A1   5/2011   Brenner et al.

FOREIGN PATENT DOCUMENTS

| EP | 3260495 B1 | 12/2017 | | |
| KR | 1020180066257 A | 6/2018 | | |
| WO | 2014/147106 A2 | 9/2014 | | |
| WO | 2019/224129 A1 | 11/2019 | | |
| WO | WO-2020070176 A1 | * | 4/2020 | .............. C08J 11/04 |
| WO | 2021/032459 A1 | 2/2021 | | |
| WO | 2021/032460 A1 | 2/2021 | | |

OTHER PUBLICATIONS

Brandrup, J., Immergut, E. H., Eds. Polymer Handbook, 3rd ed. Wiley, New York, 1989; Chapter 3).
Busico, V. et al. Alk-1-ene Polymerization in the Presence of a Monocyclopentadienyl Zirconium(IV) Acetamidinate Catalyst: Microstructural and Mechanistic Insights, Macromol. Rapid Commun. 2007, 28, 1128.
Cheng, H. N., 13C NMR Analysis of Ethylene-Propylene Rubber, Macromolecules 17 (1984), 1950.
Del Hierro, P., Soluble Fraction Analysis in polypropylene, The Column, Feb. 2014. pp. 18-23.
European Application No. 21179097.7, Search Report dated Dec. 1, 2021.
T. Glomsaker, Warpage-Crystallinity relations in rotational moulding of polypropylene, Polym. Eng. and Sci., 522-530, 2009, DOI 10.1002/pen.21322.
Singh, G., et al. Triad sequence determination of ethylene-propylene copolymers—application of quantitative 13C NMRPolymer Testing 28 5 (2009), 475).
Wang, Wen-Jun, et al. Structural Analysis of Ethylene/Propylene Copolymers Synthesized with a Constrained Geometry Catalyst, Macromolecules 2000, 33, 1157-1162.
Zhou, Zhe, et al., A new decoupling method for accurate quantification of polyethylene copolymer composition and triad sequence distribution with 13C NMR, Journal of Magnetic Resonance 187 (2007) 225-233.
Korean Application No. 10-2024-7000706, Decision to Grant dated Oct. 10, 2024.

* cited by examiner

*Primary Examiner* — Deve V Hall
(74) *Attorney, Agent, or Firm* — Tarolli, Sundheim, Covell & Tummino LLP

(57) ABSTRACT

Polyolefin (PO) compositions derived from post-consumer recyclate (PCR) PO based materials having well balanced properties with regards to mechanical performance, low crystallization temperature, dimensional stability, and workability.

16 Claims, 1 Drawing Sheet

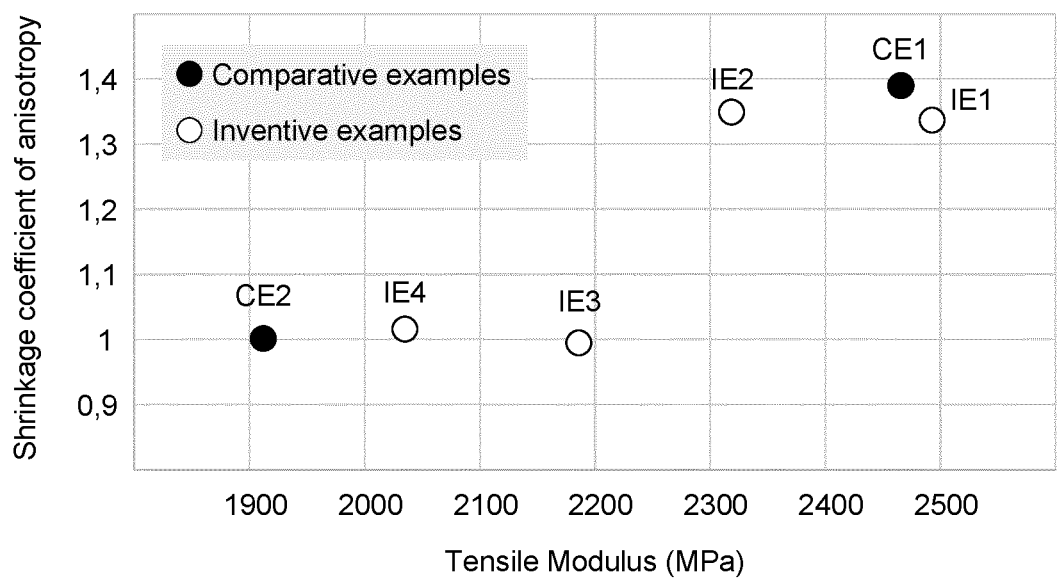

COMPOSITIONS DERIVED FROM POST-CONSUMER RECYCLATES BASED MATERIALS WITH LOW CRYSTALLIZATION TEMPERATURE

FIELD OF THE INVENTION

The present invention relates to polyolefin (PO) compositions derived from post-consumer recyclates (PCR) PO based materials having well balanced properties with regards to mechanical performance, low crystallization temperature, and workability.

BACKGROUND

Recycling of polymers generally distinguishes between physical (comprising mechanical recycling and solvent based recycling) and chemical recycling (comprising depolymerisation, thermolysis, and biodegradation). Prior to the respective recycling steps, the waste is pretreated comprising inter alia shredding the waste and separating different components. Polyolefins, in particular polyethylene and polypropylene, are increasingly consumed in large amounts in a wide range of applications, including fibres, automotive components, household components, and a great variety of manufactured articles.

Polyethylene and polypropylene based materials are a particular problem as these materials are extensively used in packaging. Taking into account the huge amount of waste collected compared to the amount of waste recycled back into the stream, there is still a great potential for intelligent reuse of plastic waste streams and for mechanical recycling of plastic wastes.

Generally, recycled quantities of polypropylene on the market are mixtures of both polypropylene (PP) and polyethylene (PE), this is especially true for post-consumer waste streams. Moreover, commercial recyclates from post-consumer waste sources are conventionally cross contaminated with non-polyolefin materials, such as polyethylene terephthalate, polyamide, polystyrene or non-polymeric substances like wood, paper, glass or aluminum. These cross-contaminations drastically limit final applications of recycling streams such that no profitable final uses remain.

In addition, recycled polyolefin materials normally have properties which are much worse than those of the virgin materials, unless the amount of recycled polyolefin added to the final compound is extremely low. For example, such materials often have limited impact strength and poor mechanical properties (such as e.g. brittleness) and thus, they do not fulfil customer requirements. Further, the workability of recycled polyolefin tends to be worse than that of virgin materials. For several applications, e.g. tubes, containers, automotive components, or household articles, these limitations exclude the application of recycled materials for high quality parts, and means that they are only used in low-cost, non-demanding applications, such as e.g. in construction or in furniture. In order to improve the mechanical properties of these recycled materials, generally relatively large amounts of virgin materials (produced from oil) are added.

It is in particular challenging to provide tubes, containers, automotive components, or household articles derived from recycled waste, wherein the properties in terms of mechanical properties, crystallization temperature, dimensional stability and workability are well balanced.

EP3260495 relates to components for household applications derived from recycled polyolefin. The composition comprises a mineral filler and/or a reinforcing filler. The composition comprising the mineral filler however needs a large amount of neat polypropylene.

Thus, there remains a need in the art to provide recycled polyolefin solutions for in particular tube materials that are well balanced in properties such as mechanical properties, crystallization temperature, and workability and comprise a large amount of PCR PO based materials.

It has surprisingly been found that the inventive polyolefin compositions derived from PCR materials comprising non-polyolefins and other contaminants achieve a good level of mechanical properties, crystallization temperature, as well as workability.

FIG. 1 depicts the tensile modulus as a function of shrinkage coefficient of anisotropy of inventive (white) and comparative (black) examples.

SUMMARY OF THE INVENTION

In the broadest aspect, the present invention provides a polyolefin composition obtainable by blending
  a) 10 to 40 wt.-% of a post-consumer recyclate polyolefin based material (PCR-PO) having a melt flow rate (determined according to ISO 1133, 2.16 kg, 230° C.) of 1 to 50 g/10 min;
  b) 10 to 35 wt.-% of a polypropylene composition (PP) having a C2 weight content of less than 3.4 wt.-%, based on the total weight of the polypropylene composition (PP), wherein the polypropylene composition (PP) is selected from the group consisting of polypropylene homopolymer (h-PP1) having a melt flow rate (determined according to ISO 1133, 2.16 kg, 230° C.) of 10 to 40 g/10 min, polypropylene random copolymer (r-PP), and mixtures of the polypropylene random copolymer (r-PP) with a polypropylene homopolymer (h-PP2);
  c) 30 to 55 wt.-% of an inorganic filler;
  each based on the total weight of the polyolefin composition, wherein the polyolefin composition has a crystallization temperature Tc (determined according to ISO 11357) of 125° C. or less and the flexural modulus (determined according to ISO 178) is 2000 MPa or more.

The invention is based on the surprising finding that a polyolefin composition having well balanced properties with regards to mechanical properties, crystallization temperature, as well as workability is obtainable when a post-consumer recyclate polyolefin based material (PCR-PO) is blended with a polypropylene composition (PP) having certain C2 content and rather high amounts of an inorganic filler. The inventors surprisingly found that such polyolefin composition provide an improvement in properties such as shrinkage and stiffness of articles obtained by said polyolefin composition.

The present invention is further directed to an injection moulded article, preferably a tube, comprising the polyolefin composition.

Further, the invention is directed to a process of manufacturing a polyolefin composition, the process comprising the steps of blending
  a) 10 to 40 wt.-% of a post-consumer recyclate polyolefin based material (PCR-PO) having a melt flow rate (determined according to ISO 1133, 2.16 kg, 230° C.) of 1 to 50 g/10 min; with
  b) 10 to 35 wt.-% of a polypropylene composition (PP) having a C2 weight content of less than 3.4 wt.-%, based on the total weight of the polypropylene composition (PP), wherein the polypropylene composition (PP) is selected from the group consisting of polypropylene homopolymer (h-PP1) having a melt flow rate (determined according to ISO 1133, 2.16 kg, 230° C.) of 10 to 40 g/10 min, polypropylene random copolymer (r-PP), and mixtures of the polypropylene random copolymer (r-PP) with a polypropylene homopolymer (h-PP2); and c) 30 to 55 wt.-% of an inorganic filler; to receive a polyolefin composition, with each amount based on the total weight of the polyolefin composition, preferably wherein the polyolefin composition has a crystallization temperature Tc (determined according to ISO 11357) of 125° C. or less and the flexural modulus (determined according to ISO 178) is 2000 MPa or more.

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below.

Unless clearly indicated otherwise, use of the terms "a," "an," and the like refers to one or more.

For the purposes of the present description and of the subsequent claims, the term "recycled waste" is used to indicate a material recovered from both post-consumer waste and industrial waste, as opposed to virgin polymers and/or materials.

"Post-consumer waste" refers to objects having completed at least a first use cycle (or life cycle), i.e. having already served their first purpose; while "industrial waste" refers to manufacturing scrap, which does not normally reach a consumer. According to the present invention, the waste stream is a consumer waste stream, such a waste stream may originate from conventional collecting systems such as those implemented in the European Union. Post-consumer waste material is characterized by a limonene content of from 0.10 to 500 ppm (as determined using solid phase microextraction (HS-SPME-GC-MS) by standard addition). For the purpose of the present description and the subsequent claims, the term "recycled waste polyolefin based material" refers to polyolefin material derived from post-consumer waste and/or industrial waste and wherein the recycled waste polyolefin based material comprises at least 88 wt.-%, preferably at least 92 wt.-%, more preferably at least 96 wt.-%, of polyolefins, based on the total weight of the recycled waste polyolefin based material. For the purposes of the present description and of the subsequent claims, the term "post-consumer recyclate polyolefin based material" (PCR-PO) refers to polyolefin material derived from post-consumer waste and wherein the PCR-PO comprises at least 88 wt.-%, preferably at least 92 wt.-%, more preferably at least 96 wt.-%, of polyolefins, based on the total weight of the PCR-PO, having completed at least a first use cycle (or life cycle), i.e. having already served their first purpose. Post-consumer recyclate polypropylene based material (PCR-PP) refers to polypropylene material comprising at least 80 wt.-% of polypropylene, based on the total weight of the PCR-PP, having completed at least a first use cycle (or life cycle), i.e. having already served their first purpose. Likewise, post-consumer recyclate polyethylene based material (PCR-PE) refers to polyethylene material comprising at least 65 wt.-% of polyethylene, based on the total weight of the PCR-PE, having completed at least a first use cycle (or life cycle), i.e. having already served their first purpose. Post-consumer recyclate polyolefin based material (PCR-PO) may also refer to a blend of two or more different post-consumer recyclate polyolefin based materials (PCR-PO), preferably to a blend of a PCR-PP and PCR-PE. A PCR-PP/PCR-PE blend may have a weight ratio of PP: PE from 20:80 to 80:20.

It should be understood that PCR-PO may vary broadly in composition, i.e. may include polyolefin homopolymers and polyolefin copolymers.

Conventionally the PCR-PO according to the present invention may have one or more of the following:
residual chalk content determined as described below;
residual talc content determined as described below;
residual content of metals (determined by x ray fluorescence (XRF));
residual amount of paper determined as described below;
residual amount of wood determined as described below;
total free fatty acid content of 0.1 to 100 ppm as measured by using headspace solid phase micro-extraction (HS-SPME-GC-MS).

Talc and chalk content:
TGA according to the following procedure:
Thermogravimetric Analysis (TGA) experiments may be performed with a Perkin Elmer TGA 8000. Approximately 10-20 mg of material shall be placed in a platinum pan. The temperature is equilibrated at 50° C. for 10 minutes, and afterwards raised to 950° C. under nitrogen at a heating rate of 20° C./min. The weight loss between about 550° C. and 700° C. ($WCO_2$) is assigned to $CO_2$ evolving from $CaCO_3$, and therefore the chalk content is evaluated as:

Chalk content=$100/44 \times WCO_2$

Afterwards the temperature is lowered to 300° C. at a cooling rate of 20° C./min. Then the gas is switched to oxygen, and the temperature is raised again to 900° C. The weight loss in this step is assigned to carbon black (Wcb). Knowing the content of carbon black and chalk, the ash content excluding chalk and carbon black is calculated as:

Ash content=(Ash residue)$-56/44 \times WCO_2-Wcb$

Where Ash residue is the weight % measured at 900° C. in the first step conducted under nitrogen. The ash content is estimated to be the same as the talc content for the investigated recyclates.

Amount of Paper, Wood:
Paper and wood are determined by conventional laboratory methods including milling, flotation, microscopy and Thermogravimetric Analysis (TGA).

For the purpose of this invention any polyolefin based material comprising at least 88 wt.-% of polyolefin, based on the total weight of the polyolefin based material, having a limonene content of from 0.05 to 500 ppm, preferably from 0.10 to 500 ppm (as determined using solid phase microextraction (HS-SPME-GC-MS) by standard addition) shall be considered a PCR-PO.

For the purpose of this invention the PCR-PO has at least one of the following:
a content of limonene of from 0.05 to 500 ppm, preferably from 0.10 to 500 ppm, more preferably from 0.1 to 100 ppm, still more preferably from 0.1 to 50 ppm, and in particular from 0.1 to 20 ppm (as determined using solid phase microextraction (HS-SPME-GC-MS) by standard addition);
a content of polystyrene of up to 6.0 wt.-%;

a content of talc of up to 3 wt.-%;
a content of chalk of up to 1.0 wt.-%;
a content of polyamide(s) of up to 5.0 wt.-%;
a content of fatty acids (as determined using solid phase microextraction (HS-SPME-GC-MS) by standard addition) of 1.0 to 100 ppm.

For the purposes of the present description and of the subsequent claims, the term post-consumer recyclate polyolefin based material (PCR-PO) further indicates a polymer material including predominantly units derived from polyolefins (derived from ethylene, propylene, butylene, octene, and the like) apart from other polymeric ingredients of arbitrary nature. Such polymeric ingredients may for example originate from monomer units derived from styrene derivatives such as vinylstyrene, substituted and unsubstituted acrylates, substituted and unsubstituted methacrylates. Conventionally further components such as fillers, including organic and inorganic fillers for example talc, chalk, carbon black, and further pigments such as $TiO_2$ as well as paper and cellulose may be present.

Said polymeric materials can be identified in the PCR-PO composition by means of quantitative $^{13}C\{^1H\}$ NMR measurements as known in the art. Therewith, different units in the polymeric chain can be distinguished and quantified. These units are ethylene units (C2 units), units having 3, 4 and 6 carbons and units having 7 carbon atoms.

Thereby, the units having 3 carbon atoms (C3 units) can be distinguished in the NMR spectrum as isolated C3 units (isolated C3 units) and as continuous C3 units (continuous C3 units) which indicate that the polymeric material contains a propylene based polymer. These continuous C3 units can also be identified as iPP units.

The units having 3, 4, 6 and 7 carbon atoms describe units in the NMR spectrum which are derived from two carbon atoms in the main chain of the polymer and a short side chain or branch of 1 carbon atom (isolated C3 unit), 2 carbon atoms (C4 units), 4 carbon atoms (C6 units) or 5 carbon atoms (C7 units).

The units having 3, 4 and 6 carbon atoms (isolated C3, C4 and C6 units) can derive either from incorporated comonomers (propylene, 1-butene and 1-hexene comonomers) or from short chain branches formed by radical polymerization.

Post-consumer recyclate polyolefin based material(s) as used herein are commercially available. Suitable blends include a number of recyclates available from Mtm plastics under the brand name Purpolen or Dipolen or Systalen from Der Grüne Punkt. Other preferred post-consumer recyclate polyolefin based material(s) are polypropylene rich recycled material(s). Preferably, the polypropylene rich recycled material is obtained from recycled waste by means of plastic recycling processes known in the art. Such PP rich recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polypropylene rich recycled materials include: Dipolen®PP, Purpolen®PP (Mtm Plastics GmbH), MOPRYLENE PC B-420 White, MOPRYLENE PC B 440 (Morssinkhof Plastics, NL), SYSTALEN PP-C24000; Systalen PP-C44000; Systalen 13404 GR 014, Systalen PP-C14900 GR000 (Der grüne Punkt, DE), Vision (Veolia) PPC BC 2006 HS or PP MONO.

The term "virgin" denotes the newly produced materials and/or objects prior to their first use, which have not already been recycled. The term "recycled material" such as used herein denotes materials reprocessed from "recycled waste".

Virgin materials and recycled materials easily can be differentiated based on absence or presence of contaminants such as limonene and/or fatty acids and/or paper and/or wood.

A blend denotes a mixture of two or more components, wherein at least one of the components is polymeric. In general, the blend can be prepared by mixing the two or more components. Suitable mixing procedures are known in the art. The carbon black containing polyolefin homopolymer (CB-PO) exemplarily is a blend comprising a polyolefin and carbon black.

If not indicated otherwise "%" refers to weight-%.

When referred to compositions and the weight percent of the therein comprised ingredients it is to be understood that according to the present invention the overall amount of ingredients does not exceed 100% (±1% due to rounding).

DETAILED DESCRIPTION

The polyolefin composition according to the present invention is obtainable by blending polyolefin composition obtainable by blending
a) 10 to 40 wt.-% of a post-consumer recyclate polyolefin based material (PCR-PO) having a melt flow rate (determined according to ISO 1133, 2.16 kg, 230° C.) of 1 to 50 g/10 min;
b) 10 to 35 wt.-% of a polypropylene composition (PP) having a C2 weight content of less than 3.4 wt.-%, based on the total weight of the polypropylene composition (PP), wherein the polypropylene composition (PP) is selected from the group consisting of polypropylene homopolymer (h-PP1) having a melt flow rate (determined according to ISO 1133, 2.16 kg, 230° C.) of 10 to 40 g/10 min, polypropylene random copolymer (r-PP), and mixtures of the polypropylene random copolymer (r-PP) with a polypropylene homopolymer (h-PP2);
c) 30 to 55 wt.-% of an inorganic filler;
each based on the total weight of the polyolefin composition,
wherein the polyolefin composition has a crystallization temperature Tc (determined according to ISO 11357) of 125° C. or less and the flexural modulus (determined according to ISO 178) is 2000 MPa or more.

It is to be understood that the filler content refers to the overall filler content based on the polyolefin composition. Hence, when referred to fillers in the polyolefin composition also the fillers, which may e.g. potentially be comprised in post-consumer recyclate polyolefin based material (PCR-PO) or polypropylene homopolymer (h-PP1) are also encompassed.

According to the present invention 100 wt.-% of the post-consumer recyclate polyolefin based material (PCR-PO) originate from post-consumer waste, such as from conventional collecting systems (curb-side collection), such as those implemented in the European Union.

Said post-consumer waste can be identified by its limonene content. It is preferred that the post-consumer waste has a limonene content of from 0.05 to 500 ppm, preferably from 0.10 to 500 ppm.

The invention provides said polyolefin composition, wherein the components are blended preferably in the following amounts:
a) 20 to 38 wt.-%, preferably 25 to 35 wt.-%, more preferably 28 to 32 wt.-%, of the post-consumer recyclate polyolefin based material (PCR-PO);

b) 15 to 33 wt.-%, preferably 22 to 32 wt.-%, more preferably 25 to 30 wt.-%, of the polypropylene composition (PP); and c) 35 to 50 wt.-%, preferably 38 to 46 wt.-%, more preferably 39 to 45 wt.-%, of the inorganic filler, each based on the total weight of the polyolefin composition.

Preferably, the post-consumer recyclate polyolefin based material (PCR-PO) is selected from the group consisting of post-consumer recyclate polypropylene based material (PCR-PP), post-consumer recyclate polyethylene based material (PCR-PE), and blends thereof, more preferably post-consumer recyclate polypropylene based material (PCR-PP).

In another preferred embodiment, the post-consumer recyclate polyolefin based material (PCR-PO) preferably comprises a total amount of propylene units (C3 units) of from 80.0 wt.-% to 99.0 wt.-%, more preferably of from 85.0 wt.-% to 95.0 wt.-%, even more preferably of from 87.0 wt.-% to 93.0 wt.-% and most preferably of from 88.0 wt.-% to 92.0 wt.-%, based on the total weight of the PCR-PO. According to the present invention, these materials may be referred to as post-consumer recyclate polypropylene based material (PCR-PP). In this connection, it is preferred when the ethylene units (C2 units) are determined according to CRYSTEX QC method ISO 6427 Annex B. Without being bound to any theory, it is assumed that when the C2 units of a PCR-PO material are determined according to CRYSTEX QC method ISO 6427 Annex B the vast majority of the remaining polyolefin units may be attributed to propylene units (C3 units).

In a preferred embodiment, the post-consumer recyclate polyolefin based material (PCR-PO) preferably comprises a total amount of ethylene units (C2 units) of from 65.0 wt.-% to 99.0 wt.-%, more preferably of from 68.0 wt.-% to 96.0 wt.-%, even more preferably of from 70.0 wt.-% to 92.0 wt.-% and most preferably of from 72.0 wt.-% to 90.0 wt.-%, based on the total weight of the PCR-PO. According to the present invention, these materials may be referred to as post-consumer recyclate polyethylene based material (PCR-PE).

In yet another preferred embodiment, the post-consumer recyclate polyolefin based material (PCR-PO) preferably comprises a total amount of propylene units (C3 units) of from 35.0 wt.-% to less than 80.0 wt.-%, more preferably of from 38.0 wt.-% to 75.0 wt.-%, even more preferably of from 40.0 wt.-% to 70.0 wt.-% and most preferably of from 49.0 wt.-% to 60.0 wt.-% and a total amount of ethylene units (C2 units) of from 20.0 wt.-% to less than 65.0 wt.-%, more preferably of from 25.0 wt.-% to 62.0 wt.-%, even more preferably of from 30.0 wt.-% to 60.0 wt.-% and most preferably of from 40.0 wt.-% to 51.0 wt.-%, each based on the total weight of the PCR-PO. According to the present invention, these materials may be referred to as a blend of post-consumer recyclate polyethylene based material (PCR-PE) and post-consumer recyclate polypropylene based material (PCR-PP), i.e. a PCR-PP/PCR-PE blend.

Preferably, the post-consumer recyclate polyolefin based material (PCR-PO) has a melt flow rate (ISO 1133, 2.16 kg, 230° C.) of 2 to 40 g/10 min, more preferably of 3 to 35 g/10 min, even more preferably of 5 to 25 g/10 min, and in particular of 8 to 20 g/10 min. In a particular embodiment, the post-consumer recyclate polyolefin based material (PCR-PO) has a melt flow rate (ISO 1133, 2.16 kg, 230° C.) of 1 to 10 g/10 min, more preferably of 2 to 8 g/10 min, even more preferably of 3 to 7 g/10 min. In another particular embodiment, the post-consumer recyclate polyolefin based material (PCR-PO) has a melt flow rate (ISO 1133, 2.16 kg, 230° C.) of 20 to 50 g/10 min, more preferably of 25 to 45 g/10 min, even more preferably of 30 to 40 g/10 min.

Preferably, the post-consumer recyclate polyolefin based material (PCR-PO) has ethylene units (C2 units) (determined according to CRYSTEX QC method ISO 6427 Annex B) of 1 to 18 wt.-%, more preferably of 2 to 15 wt.-%, even more preferably of 3 to 12 wt.-%, and in particular of 4 to 10 wt.-%, based on the total weight of the post-consumer recyclate polyolefin based material (PCR-PO). According to the present invention, such a post-consumer recyclate polyolefin based material (PCR-PO) is referred to as post-consumer recyclate polypropylene based material (PCR-PP).

Preferably, the post-consumer recyclate polyolefin based material (PCR-PO) has a tensile modulus (determined according to DIN EN ISO 527, 1 mm/min) of more than 600 MPa, more preferably more than 700 MPa, even more preferably more than 800 MPa. It is further preferred that the post-consumer recyclate polyolefin based material (PCR-PO) has a tensile modulus (determined according to DIN EN ISO 527, 1 mm/min) of 600 to 2500 MPa, more preferably of 800 to 2000 MPa, even more preferably of 900 to 1800 MPa, and in particular of 1000 to 1600 MPa.

Preferably, the post-consumer recyclate polyolefin based material (PCR-PO) has a Charpy (determined according to ISO 179-1/1 eA at 23±2° C.) of 2.0 to 10.0 kJ/m$^2$, more preferably of 2.5 to 9.0 kJ/m$^2$, even more preferably of 3.0 to 8.0 kJ/m$^2$, still more preferably of 3.5 to 7.0 kJ/m$^2$, and in particular of 4.0 to 6.0 kJ/m$^2$.

Preferably, the post-consumer recyclate polyolefin based material (PCR-PO) has a crystallization temperature Tc (determined according to ISO 11357) of 116 to 132° C., more preferably of 118 to 130° C., even more preferably of 120 to 128° C., and in particular of 122 to 126° C.

Preferably, the post-consumer recyclate polyolefin based material (PCR-PO) has a half-time of crystallization (determined according to ISO 11357-7 at 135° C.) of 2.0 to 6.5 min, more preferably of 2.5 to 5.0 min, even more preferably of 3.0 to 4.5 min, and in particular of 3.4 to 4.2 min.

Preferably, the post-consumer recyclate polyolefin based material (PCR-PO) has a density (determined according to DIN EN ISO 1183) of 900 to 956 kg/m$^3$, more preferably of 905 to 950 kg/m$^3$, even more preferably of 908 to 948 kg/m$^3$, and in particular of 910 to 945 kg/m$^3$.

Preferably, the post-consumer recyclate polyolefin based material (PCR-PO) has a soluble fraction (SF, determined according to CRYSTEX QC method ISO 6427 Annex B), present in an amount in the range from 4.0 to 40.0 wt.-%, more preferably from 5.0 to 30.0 wt.-%, even more preferably from 6.0 to 20.0 wt.-%, and in particular from 7.0 to 15.0 wt.-%, relative to the total weight of the PCR-PO.

Preferably, the post-consumer recyclate polyolefin based material (PCR-PO) has a crystalline fraction (CF, determined according to CRYSTEX QC method ISO 6427 Annex B), present in an amount in the range from 60.0 to 96.0 wt.-%, more preferably from 70.0 to 95.0 wt.-%, even more preferably from 80.0 to 94.0 wt.-%, and in particular from 85.0 to 93.0 wt.-%, relative to the total weight of the total weight of the PCR-PO.

Preferably, the post-consumer recyclate polyolefin based material (PCR-PO) has an ethylene content of the soluble fraction (measured by Fourier Transform Infrared Spectroscopy (FTIR) during CRYSTEX analysis), in the range of 15.0 to 90.0 wt.-%, more preferably from 20.0 to 60.0 wt.-%, even more preferably from 25.0 to 52.0 wt.-%, and in particular from 26.0 to 35.0 wt.-%.

Preferably, the post-consumer recyclate polyolefin based material (PCR-PO) has an ethylene content of the crystalline fraction (measured by Fourier Transform Infrared Spectroscopy (FTIR) during CRYSTEX analysis), in the range of 1.0 to 20.0 wt.-%, more preferably from 1.0 to 15.0 wt.-%, and even more preferably from 2.0 to 10.0 wt.-%.

Preferably, the post-consumer recyclate polyolefin based material (PCR-PO) has an intrinsic viscosity of the soluble fraction (measured according to ISO 1628-1 at 135° C. in decalin), in the range from 0.05 to 5.0 dl/g, more preferably from 0.1 to 4.0 dl/g, even more preferably from 0.5 to 3.0 dl/g, and in particular from 1.0 to 2.2 dl/g.

Preferably, the post-consumer recyclate polyolefin based material (PCR-PO) has an intrinsic viscosity of the crystalline fraction (measured according to ISO 1628-1 at 135° C. in decalin), in the range from 0.1 to 5.0 dl/g, more preferably from 0.5 to 4.0 dl/g, even more preferably from 0.8 to 3.0 dl/g, and in particular from 1.1 to 2.3 dl/g.

In one embodiment of the present invention, the polyolefin composition comprises a further post-consumer recyclate polyolefin based material (PCR-PO2), wherein PCR-PO2 differs from PCR-PO at least in the melt flow rate (determined according to DIN EN ISO 1133, 230° C./2.16 kg).

Preferably, the polypropylene composition (PP) has a C2 weight content of less than 3.2 wt.-%, more preferably less than 3.0 wt.-%, and in particular less than 2.8 wt.-%, based on the total weight of the polypropylene composition (PP). In this connection, it is preferred when the ethylene units (C2 units) are determined according to CRYSTEX QC method ISO 6427 Annex B.

In a preferred embodiment of the invention, the polypropylene composition (PP) is a polypropylene homopolymer (h-PP1). In this connection, it is to be understood that the polypropylene homopolymer (h-PP1) has a C2 weight content of less than 0.5 wt.-%, preferably of less than 0.1 wt.-%.

Said polypropylene homopolymer (h-PP1) preferably has a crystallization temperature Tc (determined according to ISO 11357) of 90 to 128° C., more preferably of 95 to 127° C., even more preferably of 100 to 126° C., still more preferably of 102 to 124° C., still more preferably of 104 to 122° C., and in particular of 105 to 120° C.

Preferably, the polypropylene homopolymer (h-PP1) has a melt flow rate (determined according to ISO 1133, 2.16 kg, 230° C.) of 12 to 35 g/10 min, more preferably of 13 to 30 g/10 min, even more preferably of 14 to 28 g/10 min, and in particular of 15 to 25 g/10 min.

Preferably, the polypropylene homopolymer (h-PP1) has a flexural modulus (determined according to ISO 178) of 900 to 2500 MPa, more preferably of 1000 to 2300 MPa, even more preferably of 1000 to 1800 MPa, still more preferably of 1100 to 1700 MPa, still more preferably of 1200 to 1650 MPa, and in particular of 1250 to 1600 MPa.

Preferably, the polypropylene homopolymer (h-PP1) has an XCS content (determined at 23° C. according to ISO 64279) of less than 5 wt.-%, more preferably less than 4 wt.-%, and in particular less than 3 wt.-%.

Preferably, the polypropylene homopolymer (h-PP1) comprises less than 1 wt.-%, more preferably less than 0.4 wt.-%, and in particular less than 0.3 wt.-% of talc, based on the total weight of the polypropylene homopolymer (h-PP1).

In a preferred embodiment of the invention, the polypropylene composition (PP) is a polypropylene random copolymer (r-PP) having a crystallization temperature Tc (determined according to ISO 11357) of more than 105 to 115° C., preferably of 106 to 112° C., and in particular of 107 to 110° C.

In another preferred embodiment of the invention, the polypropylene composition (PP) is a mixture of a polypropylene random copolymer (r-PP) having a crystallization temperature Tc (determined according to ISO 11357) of more than 95 to 110° C., preferably of 100 to 108° C., and in particular of 102 to 106° C. with a polypropylene homopolymer (h-PP2) having a crystallization temperature Tc (determined according to ISO 11357) of more than 115 to 140° C., preferably of 120 to 135° C., and in particular of 122 to 130° C.

Preferably, the polypropylene random copolymer (r-PP) has a flexural modulus (determined according to ISO 178) of 400 to 1500 MPa, more preferably of 500 to 1300 MPa, and in particular of 600 to 1100 MPa.

Preferably, the polypropylene random copolymer (r-PP) has a melt flow rate (ISO 1133, 2.16 kg, 230° C.) of 1 to 40 g/10 min, more preferably of 2 to 30 g/10 min, even more preferably of 3 to 25 g/10 min, and in particular of 4 to 20 g/10 min.

Preferably, the polypropylene random copolymer (r-PP) has an XCS content (determined at 23° C. according to ISO 64279) of less than 15 wt.-%, more preferably less than 12 wt.-%, and in particular less than 10 wt.-%.

Preferably, the polypropylene random copolymer (r-PP) comprises less than 1 wt.-%, more preferably less than 0.4 wt.-%, and in particular less than 0.3 wt.-% of talc, based on the total weight of the polypropylene random copolymer (r-PP).

Polypropylene homopolymer (h-PP2) may be any known polypropylene homopolymer known in the art. Hence, it may also correspond to the polypropylene homopolymer (h-PP1) as described above in more detail.

Preferably, the polypropylene homopolymer (h-PP2) has a crystallization temperature Tc (determined according to ISO 11357) of more than 115 to 140° C., more preferably of 120 to 135° C. and in particular of 122 to 130° C.

Preferably, the polypropylene homopolymer (h-PP2) has a melt flow rate (determined according to ISO 1133, 2.16 kg, 230° C.) of 12 to 35 g/10 min, more preferably of 13 to 30 g/10 min, even more preferably of 14 to 28 g/10 min, and in particular of 15 to 25 g/10 min.

Preferably, the polypropylene homopolymer (h-PP2) has a flexural modulus (determined according to ISO 178) of 1000 to 1750 MPa, more preferably of more than 1700 to 2800 MPa, even more preferably of 1750 to 2600 MPa, and in particular of 1800 to 2500 MPa.

Preferably, the polypropylene homopolymer (h-PP2) has an XCS content (determined at 23° C. according to ISO 64279) of less than 5 wt.-%, more preferably less than 4 wt.-%, and in particular less than 3 wt.-%.

Preferably, the polypropylene homopolymer (h-PP2) comprises 0.01 to 2.0 wt.-%, more preferably 0.1 to 1.5 wt.-%, and in particular 0.3 to 1.0 wt.-% of talc, based on the total weight of the polypropylene homopolymer (h-PP2).

In a preferred embodiment of the present invention, the inorganic filler is calcium carbonate. The calcium carbonate may be provided from natural sources (ground (natural) calcium carbonates, GCC) and in synthetic forms. Typically, the natural forms are available with a wide particle-size range (e.g. from 0.5 to over 100 μm). The synthetic (precipitated) forms typically fall into the nano-size range (e.g. under 100 nm). Preferably, when referring to calcium carbonate it is referred to chalk.

In a preferred embodiment of the present invention, the polyolefin composition has a crystallization temperature Tc (determined according to ISO 11357) of 124° C. or less. In another preferred embodiment of the present invention, the polyolefin composition has a crystallization temperature Tc (determined according to ISO 11357) of 118 to 125° C., more preferably of 120 to 124° C., even more preferably of 121 to 124° C., and in particular of 122 to 124° C.

Preferably, the polyolefin composition has a flexural modulus (determined according to ISO 178) of 2000 to 2500 MPa, more preferably of 2020 to 2400 MPa, even more preferably of 2050 to 2350 MPa, and in particular of 2100 to 2300 MPa.

Preferably, the polyolefin composition has a melt flow rate (determined according to ISO 1133, 2.16 kg, 230° C.) of 9 to 35 g/10 min, more preferably of 10 to 30 g/10 min, even more preferably 11 to 28 g/10 min, still more preferably of 12 to 25 g/10 min, and in particular of 13 to 22 g/10 min.

Preferably, the polyolefin composition has a Charpy (determined according to ISO 179-1/1 eA at 23±2° C.) of 1.5 to 2.6 kJ/m$^2$, more preferably of 1.9 to 2.4 kJ/m$^2$, and in particular of 2.0 to 2.3 kJ/m$^2$.

Preferably, the polyolefin composition has heat deflection temperature (HDT; determined according to ISO 1873-2 at 0.45 MPa) of 85 to 108° C., more preferably of 90 to 104° C., and in particular of more than 95 to 100° C.

Preferably, the polyolefin composition has a half-time of crystallization (determined according to ISO 11357-7 at 135° C.) of 2.3 to 7.0 min, more preferably of 2.5 to 5.0 min, and in particular of 2.6 to 4.0 min.

The polyolefin composition may optionally further comprise a carrier. The carrier can be used to pre-mix the additives such as stabilizers and introduce them into the polyolefin composition. The carrier may be any suitable carrier known in the art. Preferably, the carrier is a polypropylene homopolymer based carried, wherein the polypropylene homopolymer has a melt flow rate (determined according to ISO 1133, 2.16 kg, 230° C.) of 0.5 to 9.0 g/10 min, more preferably of 1.0 to 7.0 g/10 min, even more preferably of 1.5 to 5.0 g/10 min, and in particular of 2.0 to 4.0 g/10 min and/or a density (determined according to DIN EN ISO 1183) of 890 to 920 kg/m$^3$, more preferably of 895 to 915 kg/m$^3$, and in particular of 900 to 910 kg/m$^3$ and/or a crystallization temperature Tc (determined according to ISO 11357) of 105 to 120° C., more preferably of 108 to 116° C., and in particular of 110 to 115° C. The carrier may be present in the polyolefin composition in an amount of 0 to 3.0 wt.-%, preferably of 0 to 2.5 wt.-%, and in particular of 0.5 to 2.0 wt.-%, based on the total amount of the polyolefin composition.

In a further aspect, the present invention is directed to an injection moulded article, preferably a tube, comprising the polyolefin composition as defined herein.

Preferably, the injection moulded article has a shrinkage in flow (SH-inF; determined according to EN ISO 1873-2, 60×60×2 mm) of less than 1.60%, more preferably less than 1.55%, and in particular less than 1.52%.

Preferably, the injection moulded article has a shrinkage in cross flow (SH-crossF; determined according to EN ISO 1873-2, 60×60×2 mm) of less than 1.50%, more preferably less than 1.40%, even more preferably less than 1.30%, and in particular less than 1.18%.

Preferably, the injection moulded article has a shrinkage in flow (SH-inF; determined according to EN ISO 1873-2, 60×60×2 mm) of 1.45 to 1.60%, more preferably of 1.47 to 1.55%, and in particular of 1.49 to 1.54%.

Preferably, the injection moulded article has a shrinkage in cross flow (SH-crossF; determined according to EN ISO 1873-2, 60×60×2 mm) of 1.00 to 1.60%, more preferably of 1.05 to 1.52%, and in particular of 1.06 to 1.3%.

Preferably, the injection moulded article has a shrinkage coefficient of anisotropy (SH-inF/SH-crossF; determined according to EN ISO 1873-2, 60×60×2 mm) of 1.38 or less, more preferably of 1.37 or less, even more preferably of 1.36 or less, still more preferably of 1.35 or less. Alternatively it is preferred that the injection moulded article has a shrinkage coefficient of anisotropy (SH-inF/SH-crossF; determined according to EN ISO 1873-2, 60×60×2 mm) of 1.00 to 1.38, more preferably of 1.00 to 1.36, even more preferably of 1.00 to 1.35. In a certain embodiment of the present invention, the injection moulded article has a shrinkage coefficient of anisotropy (SH-inF/SH-crossF; determined according to EN ISO 1873-2, 60×60×2 mm) of 1.00 to 1.10, more preferably of 1.00 to 1.05.

In a particular embodiment of the present invention, the injection moulded article has a shrinkage in flow (60×60×2 mm) of less than 1.55% and a shrinkage in cross flow (60×60×2 mm) of less than 1.18%.

All preferred aspects, definitions and embodiments as described above shall also hold for the injection moulded article.

In a further aspect, the present invention is directed to a process of manufacturing a polyolefin composition, the process comprising the steps of blending
a) 10 to 40 wt.-% of a post-consumer recyclate polyolefin based material (PCR-PO) having a melt flow rate (determined according to ISO 1133, 2.16 kg, 230° C.) of 1 to 50 g/10 min; with
b) 10 to 35 wt.-% of a polypropylene composition (PP) having a C2 weight content of less than 3.4 wt.-%, based on the total weight of the polypropylene composition (PP),
wherein the polypropylene composition (PP) is selected from the group consisting of polypropylene homopolymer (h-PP1) having a melt flow rate (determined according to ISO 1133, 2.16 kg, 230° C.) of 10 to 40 g/10 min, polypropylene random copolymer (r-PP), and mixtures of the polypropylene random copolymer (r-PP) with a polypropylene homopolymer (h-PP2); and
c) 30 to 55 wt.-% of an inorganic filler;
to receive a polyolefin composition, with each amount based on the total weight of the polyolefin composition, preferably wherein the polyolefin composition has a crystallization temperature Tc (determined according to ISO 11357) of 125° C. or less and the flexural modulus (determined according to ISO 178) is 2000 MPa or more.

All preferred aspects, definition and embodiments as described above shall also hold for the process of manufacturing.

Preferably, the polyolefin composition is prepared via melt blending on exemplarily a co-rotating twin screw extruder (ZSK). The respective components (PCR-PO, PP, and inorganic filler) are added into the apparatus (e.g. a co-rotating twin screw extruder) and blended. Alternatively, at least one of the respective components (PCR-PO, PP, and inorganic filler) are pre-mixed outside the apparatus (e.g. pre-mixing in a mixing silo) and then added to the remaining components into the apparatus, where the final blending to receive the polyolefin composition is conducted. Any suitable apparatus may be used. After blending, the polymer melt mixture can be discharged and pelletized.

The gist of the present invention will be further outlined in the following examples.

Experimental Part

1. Test Methods a) Melt Flow Rate

Melt flow rates were measured with a load of 2.16 kg (MFR$_2$) at 230° C. as indicated. The melt flow rate is that quantity of polymer in grams which the test apparatus standardized to ISO 1133 extrudes within 10 minutes at a temperature of 230° C. under a load of 2.16 kg. MFR$_2$ (230° C.) is measured according to ISO 1133 (230° C., 2.16 kg load).

b) Tensile Modulus [MPa]

The Tensile Modulus was measured according to ISO 527-2 (cross head speed=50 mm/min; 23° C., unless identified differently) using injection molded specimens as described in EN ISO 1873-2 (dog bone shape, 4 mm thickness). To determine stress at yield, a speed of 50 mm/min was used.

c) Charpy Notched Impact Strength (NIS)

The Charpy notched impact strength was determined according to ISO 179-1/1 eA on notched 80 mm×10 mm×4 mm specimens (specimens were prepared according to ISO 179-1/1 eA). Testing temperatures were 23±2° C. Injection moulding was carried out according to ISO 19069-2.

d) Flexural Modulus [MPa]

The flexural modulus was determined according to ISO 178 method A (3-point bending test) on 80 mm×10 mm×4 mm specimens. Following the standard, a test speed of 2 mm/min and a span length of 16 times the thickness was used. The testing temperature was 23±2° C. Injection moulding was carried out according to ISO 19069-2.

e) DSC analysis, melting temperature (Tm) and heat of fusion (Hf), crystallization temperature (Tc) and melt enthalpy (Hm)

The DSC was measured with a TA Instrument Q2000 differential scanning calorimetry (DSC) on 5 to 7 mg samples. DSC was run according to ISO 11357/part 3/method C2 in a heat/cool/heat cycle with a scan rate of 10° C./min in the temperature range of −30 to +225° C. The crystallization temperature (Tc) was determined from the cooling step, while melting temperature (Tm) and melting enthalpy (Hm) can be determined from the second heating step. The crystallinity can be calculated from the melting enthalpy by assuming an Hm-value of 209 J/g for a fully crystalline polypropylene (see Brandrup, J., Immergut, E. H., Eds. Polymer Handbook, 3rd ed. Wiley, New York, 1989; Chapter 3).

f) Shrinkage

Shrinkage was determined on injection moulded quadratic plaques (60×60×2 mm). The film gated specimens were moulded on an 20 Engel V60 injection moulding machine, equipped with a small (ø22 mm; L/D=20) screw according to EN ISO 1873-2. Process parameters were 200° C. melt temperature, 100 mm/s flow front velocity, holding pressure time 10 seconds, hydraulic holding pressure level 10 bar. After a time span of at least 96 h after demoulding the dimensions (length and width) of the plaques were measured and compared to the dimensions of the cavity at room 25 temperature.

g) Half-Time of Crystallization

Differential scanning calorimeter was used to determine the half-time of crystallization. This method replaces the test "Crystallization speed", according to ISO 11357-7 and in particular considering only the isothermal crystallization rate. The sample is heated with a speed of 10 or 20° C./min to 225° C. which is well above the melting temperature of isotactic polypropylene. In order to erase the thermal history, the sample is kept at this temperature for at least 5 min. Afterwards, the sample is quickly quenched to the temperature of isothermal crystallization. In the present study, the temperature of isothermal crystallization was defined at 135° C. During the isothermal crystallization the heat-flow as a function of time has been recorded. The half-time of crystallization is determined as the peak of the curve heat-flow/time. The half-time of crystallization represents the time at which the half of the sample has been solidified at the selected temperature.

h) Crystalline and Soluble Fractions and their Respective Properties (Crystex Analysis)

The crystalline (CF) and soluble fractions (SF) of the polyolefin (PO) compositions, the final ethylene units content of the PO composition, the ethylene units content of the respective fractions, as well as the intrinsic viscosities of the respective fractions were analysed by the CRYSTEX QC Polymer Char (Valencia, Spain) on basis ISO 6427 Annex B: 1992 (E). A schematic representation of the CRYSTEX QC instrument is presented in Del Hierro, P.; Ortin, A.; Monrabal, B.; 'Soluble Fraction Analysis in polypropylene, The Column, February 2014. Pages 18-23. The crystalline and amorphous fractions are separated through temperature cycles of dissolution in 1,2,4-trichlorobenzene (1,2,4-TCB) at 160° C., crystallization at 40° C. and re-dissolution in 1,2,4-TCB at 160° C. Quantification of SF and CF and determination of ethylene content (C2) are achieved by means of an infrared detector (IR4) and an online 2-capillary viscometer is used for the determination of the intrinsic viscosity (IV).

IR4 detector is a multiple wavelength detector detecting IR absorbance at two different bands ($CH_3$ stretching vibration (centred at approx. 2960 cm$^{-1}$) and $CH_x$ stretching vibration (2700-3000 cm$^{-1}$)) which can be used to determine of the concentration and the ethylene content in ethylene-propylene copolymers (EP copolymers). The IR4 detector is calibrated with series of 8 EP copolymers with known ethylene content in the range of 2 wt.-% to 69 wt.-% (determined by 13C-NMR) and each at various concentrations, in the range of 2 and 13 mg/ml. To account for both features, concentration and ethylene content at the same time for various polymer concentration expected during Crystex analyses the following calibration equations were applied:

$$Conc = a + b*\text{Abs(CH)} + c*(\text{Abs}(CH_x))^2 + \text{Equation 1}$$
$$d*\text{Abs}(CH_3) + e*(\text{Abs}(CH_3))^2 + f*\text{Abs}(CH_x)*\text{Abs}(CH_3)$$

$$CH_3/1000C = a + b*\text{Abs}(CH_x) + c*\text{Abs}(CH_3) + \text{Equation 2}$$
$$d*(\text{Abs}(CH_3)/\text{Abs}(CH_x)) + e*(\text{Abs}(CH_3)/\text{Abs}(CH_x))^2$$

The constants a to e for equation 1 and a to f for equation 2 were determined by using least square regression analysis.

The CH3/1000C is converted to the ethylene content in wt.-% using following relationship:

wt.-% (Ethylene in *EP* Copolymers)=100–CH$_3$/1000TC*0.3     Equation 3:

Amount of Soluble fraction (SF) and Crystalline Fraction (CF) are correlated through the XS calibration to the "Xylene Cold Soluble" (XCS) fraction and "Xylene Cold Insoluble" (XCI) fraction, respectively, determined according to standard gravimetric method as per ISO16152. XS calibration is achieved by testing various EP copolymers with xylene cold soluble (XCS) content in the range 2-31 Wt.-%. The determined XS calibration is linear (Equation 4):

$$\text{wt.-\% } XCS = 1.01 * \text{wt.-\% } SF$$

Intrinsic viscosity (IV) of the parent EP copolymer and its soluble fraction (SF) and crystalline fraction (CF) are determined with a use of an online 2-capillary viscometer and are correlated to corresponding IV's determined by standard method in decalin according to ISO 1628-3.

Calibration is achieved with several commercial EP PP copolymers with IV=2-4 dL/g. The determined calibration curve between the Vsp, measured in CRYSTEX QC and normalized by the concentration (c), and the IV is linear (Equation 5):

$$IV \text{ (dl/g)} = a * Vsp/c$$

with a slope of a=16.2.

A sample of the PO composition to be analysed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 400 rpm to 800 rpm. To avoid sample degradation, polymer solution is blanketed with the N2 atmosphere during dissolution.

A defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt.-%] of the PO composition. During the second injection the soluble fraction (SF, at low temperature, 40° C.) and the crystalline fraction (CF, at high temperature, 160° C.) with the crystallization cycle are determined (Wt.-% SF, Wt.-% C2, IV).

$^{13}$C NMR Spectroscopy-Based Determination of C2 Content for the Calibration Standards Quantitative $^{13}$C{$^1$H} NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}$C{$^1$H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer:

$$fE = (E/(P + E))$$

The comonomer fraction was quantified using the method of Wang et. al. (Wang, W.-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to $$E = 0.5(S\beta\beta + S\beta\gamma + S\beta\delta + 0.5(S\alpha\beta + S\alpha\gamma))$$

Through the use of this set of sites the corresponding integral equation becomes $$E = 0.5(I_H + I_G + 0.5(I_C + I_D))$$

using the same notation used in the article of Wang et. al. (Wang, W.-J., Zhu, S., Macromolecules 33 (2000), 1157). Equations used for absolute propylene content were not modified. The mole percent comonomer incorporation was calculated from the mole fraction:

$$E \text{ [mol \%]} = 100 * fE.$$

The weight percent comonomer incorporation was calculated from the mole fraction:

$$E \text{ [wt \%]} = 100 * (fE * 28.06)/((fE * 28.06) + ((1 - fE) * 42.08))$$

i) Density

The density is measured according to ISO 1183-187. Sample preparation is done by compression moulding in accordance with ISO 1872-2:2007.

j) Xylene Cold Soluble Fraction (XCS Wt %)

The xylene cold soluble fraction (XCS) can be determined at 23° C. according to ISO 6427.

k) Heat DeflectionTemperature (HDT):

The HDT was determined on injection molded test specimens of 80×10×4 mm$^3$ prepared according to ISO 1873-2 and stored at +23° C. for at least 96 hours prior to measurement. The test was performed on flatwise supported specimens according to ISO 75, condition A, with a nominal surface stress of 0.45 MPa.

Materials

The used PCR-PO material has the properties as outlined in Table 1

TABLE 1

PCR-PO material properties.

| | PCR-PO |
|---|---|
| Total C2 content (wt.-%) | 4.5-8.3 |
| MFR$_2$ (g/10 min), 230° C. | 12.0-15.0 |
| Soluble fraction (wt.-%) | 9.7-10.3 |
| C2 content in soluble fraction (wt.-%) | 27.0-29.0 |
| Intrinsic viscosity soluble fraction (dL/g) | 1.2 to 1.6 |
| Intrinsic viscosity crystalline fraction (dL/g) | 1.6-1.8 |
| Tensile modulus (MPa) | 1250-1350 |
| Charpy NIS +23° C., (kJ/m$^2$) | 4.8-5.8 |
| Crystallization temperature (° C.) | 124 |
| Half-time of crystallization at 135° C. (min) | 3.8 |
| Limonene content (ppm) | 0.1 |

The properties of the commercially available (*Borealis*) applied polypropylene homopolymers (h-PP) and polypropylene random copolymer (r-PP) are summarized in Table 2. The applied polypropylene homopolymer (h-PPa to h-PPc) have a C2 weight content of less than 0.1 wt.-%.

The h-PP-based carrier HC001A having a density of 905 kg/m$^3$, an MFR$_2$ (determined according to ISO 1133, 2.16 kg, 230° C.) of 2.7 g/10 min, and a crystallization temperature Tc of 112° C. was used.

Chalk was Calcitec M/5 from Mineraria Sacilese with particle size 99%<20 μm.

TABLE 2 polypropylene composition properties; *unless indicated otherwise, the remaining wt.-% are attributed to polypropylene homopolymer.

| | h-PPa* | h-PPb* | h-PPc* | r-PPa | r-PPb |
|---|---|---|---|---|---|
| Total C2 content (wt.-%) | 1 | — | — | 3.5 | 2.5 |
| MFR$_2$ (g/10 min), 230° C. | 18-22 | 7-9 | 18-22 | 7-9 | 7-9 |
| XCS (wt.-%) | <3 | <3 | <3 | <10 | 5-7 |
| Flexural modulus (MPa) | 1900-2300 | 1350-1500 | 1350-1500 | 680-880 | 800-900 |
| Talc (wt.-%) | 0.43 | 0 | 0 | 0 | 0 |
| Tc (° C.) | 127 | 115-117 | 115-117 | 104 | 107 |

Experiments

Compositions were prepared via melt blending on a co-rotating twin screw extruder (ZSK) according to the recipes given in Table 3. The polymer melt mixture was discharged and pelletized. The mechanical properties of the compositions are also given in Table 3. It is to be understood that h-PPa in IE1 is applied as h-PP1, h-PPc in IE2 is applied as h-PP1, and h-PPa in IE4 is applied as h-PP2.

TABLE 3

Comparative and Inventive Examples of the polypropylene composition; n.m.—not measured.

| | MFR [g/10 min] | Flexural Modulus [MPa] | C2 wt.-% | IE1 | CE1 | IE2 | CE2 | IE3 | IE4 |
|---|---|---|---|---|---|---|---|---|---|
| Composition | | | | | | | | | |
| PCR-PO | 15 | 1250-1350 | 4.5-6.5 | 30 | 30 | 30 | 30 | 30 | 30 |
| h-PPa | 18-22 | 1900-2300 | <3 | 28 | — | — | — | 9 | — |
| h-PPb | 7-9 | 1350-1500 | <3 | — | 28 | — | — | — | — |
| h-PPc | 18-22 | 1350-1500 | <3 | — | — | 28 | — | — | — |
| r-PPa | 7-9 | 680-880 | 3.5 | — | — | — | 24 | 15 | — |
| r-PPb | 7-9 | 800-900 | 2.5 | — | — | — | — | — | 24 |
| Chalk | | | | 40 | 40 | 40 | 44 | 44 | 44 |
| h-PP-based Carrier | 2.7 | n.m. | n.m. | 1.6 | 1.6 | 1.6 | 1.6 | 1.6 | 1.6 |
| Stabilisers | n.m. | n.m. | n.m. | 0.4 | 0.4 | 0.4 | 0.4 | 0.4 | 0.4 |
| Properties | | | | | | | | | |
| MFR$_2$ [g/10 min] | | | | 12 | 7 | 19 | 10 | 13 | 12 |
| Density [g/cm$^3$] | | | | 1.247 | 1.247 | 1.247 | n.m. | n.m. | n.m. |
| Tensile Modulus, [MPa] | | | | 2498 | 2471 | 2324 | 1917 | 2191 | 2040 |
| Tensile stress at yield, [MPa] | | | | 21 | 21 | 20 | 17 | 18 | 17 |
| Flexural Modulus, [MPa] | | | | 2481 | 2440 | 2264 | 1929 | 2213 | 2048 |
| Charpy NIS, +23° C., [kJ/m$^2$] | | | | 2.30 | 2.40 | 2.30 | 2.41 | 2.06 | 2.37 |
| HDT B, 0.45, [MPa] | | | | 105 | 102 | 99 | 88 | 96 | 90 |
| Shrinkage in flow (SH-inF), % (60 × 60 × 2 mm) | | | | 1.57 | 1.59 | 1.49 | 1.48 | 1.52 | 1.47 |
| Shrinkage cross flow (SH-crossF), % (60 × 60 × 2 mm) | | | | 1.17 | 1.14 | 1.10 | 1.47 | 1.52 | 1.44 |
| Shrinkage coefficient of anisotropy (SH-inF/SH-crossF) | | | | 1.34 | 1.39 | 1.35 | 1.00 | 1.00 | 1.02 |
| Tc (10 K/min), ° C. | | | | 125 | 126 | 124 | 122 | 125 | 122 |
| half-time of crystallization, min at 135° C. | | | | 2.08 | 1.99 | 3.04 | 6.47 | 3.86 | 6.98 |

It can be seen that the inventive polyolefin compositions provide not only a sufficient Tensile Modulus of more than 2000 MPa but also a satisfactory MFR$_2$ value of more than 12 g/10 min Further, sufficient crystallization temperature and half-time of crystallization values are provided by the inventive polyolefin compositions. Further, low shrinkage coefficient of anisotropy of 1.35 and less secures good dimensional stability.

It should be considered, that when thick injection moulded parts (>3 mm) in MFR range>12 g/10 min are produced, polymer compositions with slow crystallization kinetics related to less crystallinity might be preferred. The crystallization temperature and half-time of crystallization can be used as a measure for the crystallization kinetics. Longer half-time of crystallization or low crystallization temperatures mean slower crystallization kinetics, smaller crystals, and less shrinkage. For semicrystalline polymers the high crystallinity will imply high-volume contraction of the materials. The volume contraction and asymmetric cooling conditions cause a buildup of internal stresses as shown in the prior art [T. Glomsaker, E. L. Hinrichsen, Å. Larsen, P. Doshev, E. Ommundsen, Warpage-Crystallinity relations in rotational moulding of polypropylene, Polym. Eng. And Sci., 522-530, 2009, DOI 10.1002/pen.21322]. Thus, major challenge remains of balancing limited anisotropy with stiffness and impact properties. The anisotropy of the inventive and comparative polymer compositions is represented by the ratio between the Shrinkage in flow and Shrinkage in cross direction. In this way, a shrinkage coefficient of anisotropy was calculated for the present polymer systems. The higher the shrinkage coefficient the higher the anisotropy in the polymer composition, which might cause internal residual stresses, warpage and low dimensional stability.

FIG. 1 shows the tensile modulus as a function of the shrinkage coefficient of anisotropy for the inventive (white) and comparative (black) examples. It can be seen that at similar shrinkage coefficient of anisotropy, the inventive examples (IE3; MFR$_2$=13 and IE4; MFR$_2$=12) show higher tensile modulus than the comparative example CE2 (MFR$_2$=10). Furthermore, the IE1 (MFR$_2$=13) shows an excellent combination of higher tensile modulus and lower shrinkage coefficient of anisotropy than the comparable example CE1 (MFR$_2$=7). The inventive example IE2 (MFR$_2$=19) demonstrates that also at high MFR ranges the combination of high tensile modulus and low anisotropy can be preserved.

The invention claimed is:

1. A polyolefin composition obtainable by blending:
    a) 10 to 40 wt. % of a post-consumer recyclate polyolefin based material (PCR-PO) having a melt flow rate (determined according to ISO 1133, 2.16 kg, 230° C.) of 1 to 50 g/10 min;
    b) 10 to 35 wt. % of a polypropylene composition (PP) having a C2weight content of less than 3.4 wt. %, based on the total weight of the polypropylene composition (PP),
    wherein the polypropylene composition (PP) is selected from the group consisting of polypropylene homopolymer (h PP1) having a melt flow rate (determined according to ISO 1133, 2.16 kg, 230° C.) of 10 to 40 g/10 min, polypropylene random copolymer (r-PP), and mixtures of the polypropylene random copolymer (r-PP) with a polypropylene homopolymer (h-PP2);
    c) 30 to 55 wt. % of an inorganic filler;
        each based on the total weight of the polyolefin composition,
    wherein the polyolefin composition has a crystallization temperature Tc (determined according to ISO 11357) of 125° C. or less and the flexural modulus (determined according to ISO 178) is 2000 MPa or more.

2. The polyolefin composition according to claim 1, wherein the components are blended in the following amounts:
    a) 20 to 38 wt. %-of the post-consumer recyclate polyolefin based material (PCR-PO);
    b) 15 to 33 wt. % of the polypropylene composition (PP); and
    c) 35 to 50 wt. % of the inorganic filler, each based on the total weight of the polyolefin composition.

3. The polyolefin composition according to claim 1, wherein the post-consumer recyclate polyolefin based material (PCR-PO) is selected from the group consisting of post-consumer recyclate polypropylene based material (PCR-PP), post-consumer recyclate polyethylene based material (PCR-PE), and blends thereof.

4. The polyolefin composition according to claim 1, wherein the post-consumer recyclate polyolefin based material (PCR-PO) has a melt flow rate (determined according to ISO 1133, 2.16 kg, 230° C.) of 2 to 40 g/10 min and/or
    has at least one of the following:
        a content of limonene of from 0.05 to 500 ppm (as determined using solid phase microextraction (HS-SPME-GC-MS) by standard addition);
        a content of polystyrene of up to 6.0 wt. %;
        a content of talc of up to 3 wt. %;
        a content of chalk of up to 1.0 wt. %;
        a content of polyamide(s) of up to 5.0 wt. %;
        a content of fatty acids (as determined using solid phase microextraction (HS-SPME-GC-MS) by standard addition) of 1.0 to 100 ppm.

5. The polyolefin composition according to claim 1, wherein the polypropylene composition (PP) has a C2 weight content of less than 3.2wt. % based on the total weight of the polypropylene composition (PP).

6. The polyolefin composition according to claim 1, wherein the polypropylene composition (PP) is a polypropylene homopolymer (h-PP1) having a crystallization temperature Tc (determined according to ISO 11357) of 90to 128° C.

7. The polyolefin composition according to claim 1, wherein the polypropylene composition (PP) is a polypropylene homopolymer (h-PP1) having a melt flow rate (determined according to ISO 1133, 2.16 kg, 230° C.) of 12to 35 g/10 min, and/or
    a flexural modulus (determined according to ISO 178) of 900 to 2500MPa.

8. The polyolefin composition according to claim 1, wherein the polypropylene composition (PP) is a polypropylene random copolymer (r-PP) having a crystallization temperature Tc (determined according to ISO 11357) of more than 105 to 115° C.
    or
    a mixture of a polypropylene random copolymer (r-PP) having a crystallization temperature Tc (determined according to ISO 11357) of more than 95 to 110° C. with a polypropylene homopolymer (h-PP2) having a crystallization temperature Tc (determined according to ISO 11357) of more than 115 to 140° C.

9. The polyolefin composition according to claim 1, wherein the inorganic filler is calcium carbonate.

10. The polyolefin composition according to claim 1, wherein the polyolefin composition has a crystallization temperature Tc (determined according to ISO 11357) of 124° C. or less.

11. The polyolefin composition according to claim 1, wherein the polyolefin composition has a flexural modulus (determined according to ISO 178) of 2000 to 2500 MPa.

12. The polyolefin composition according to claim 1, wherein the polyolefin composition has a melt flow rate (determined according to ISO 1133, 2.16 kg, 230° C.) of 9 to 35 g/10 min.

13. An injection moulded article comprising the polyolefin composition according to claim 1.

14. The injection moulded article according to claim 13 having a shrinkage in flow (60×60×2 mm) of less than 1.58% and a shrinkage in cross flow (60×60×2 mm) of less than 1.18% and/or having a shrinkage coefficient of anisotropy (SH-inF/SH-crossF; determined according to EN ISO 1873-2, 60×60×2 mm) of 1.38 or less.

15. A process of manufacturing a polyolefin composition, the process comprising the steps of blending:

a) 10 to 40 wt. % of a post-consumer recyclate polyolefin based material (PCR-PO) having a melt flow rate (determined according to ISO 1133, 2.16 kg, 230° C.) of 1 to 50 g/10 min; with b) 10 to 35 wt. % of a polypropylene composition (PP) having a C2 weight content of less than 3.4 wt. %, based on the total weight of the polypropylene composition (PP), wherein the polypropylene composition (PP) is selected from the group consisting of polypropylene homopolymer (h PP1) having a melt flow rate (determined according to ISO 1133, 2.16 kg, 230° C.) of 10 to 40 g/10 min, polypropylene random copolymer (r-PP), and mixtures of the polypropylene random copolymer (r-PP) with a polypropylene homopolymer (h-PP2); and c) 30 to 55 wt. % of an inorganic filler;

to receive a polyolefin composition, with each amount based on the total weight of the polyolefin composition.

16. The injection moulded article according to claim 13, being a tube.

* * * * *